United States Patent Office 3,432,814
Patented Mar. 11, 1969

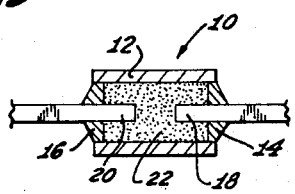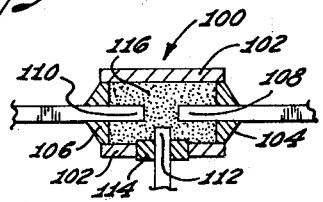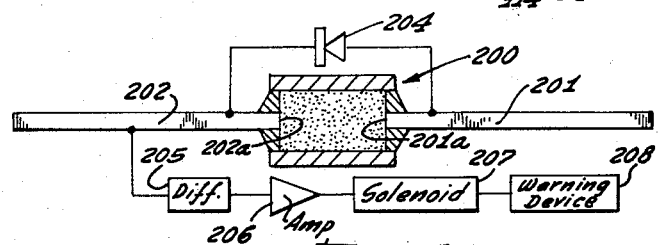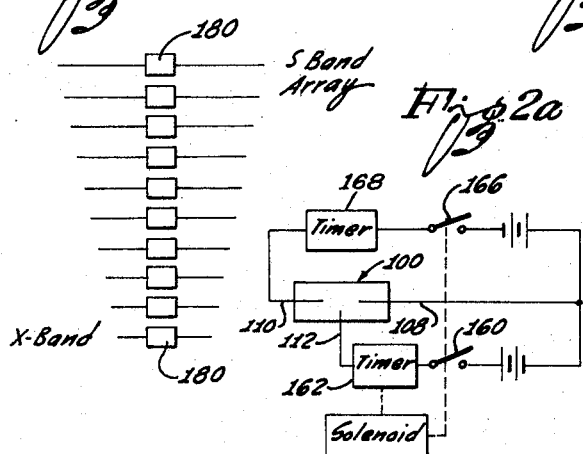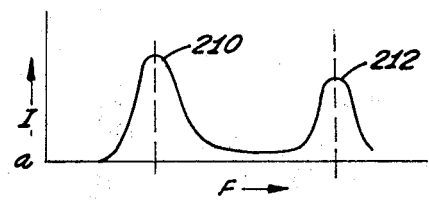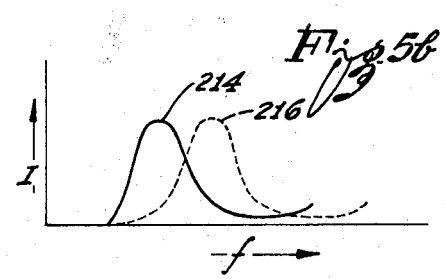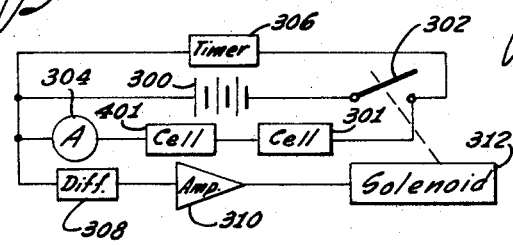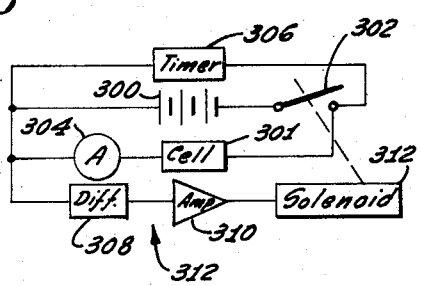
INVENTOR:
Thomas B. Bissett
Attorneys INVENTOR:
Thomas B. Bissett Attorneys

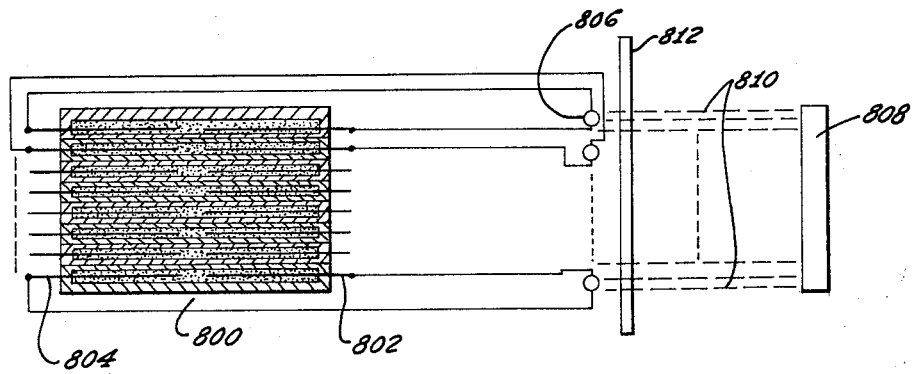
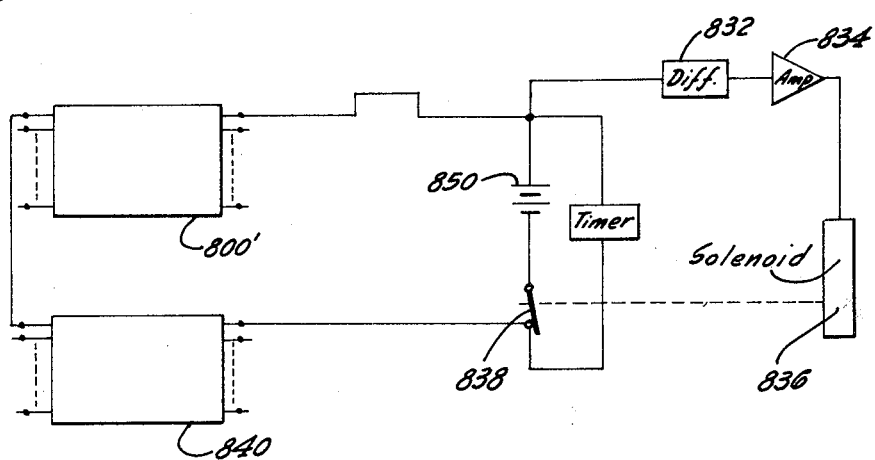
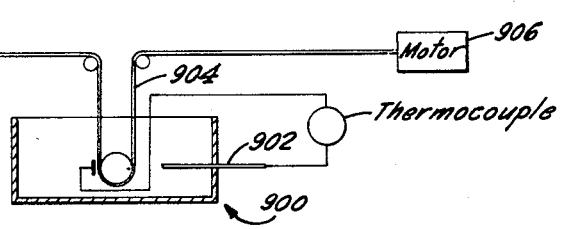
INVENTOR:
Thomas B. Bissett

3,432,814
ELECTROLYTIC DEVICES
Thomas B. Bissett, Malibu, Calif., assignor to The Bissett-Berman Corporation, Santa Monica, Calif., a corporation of California
Filed Mar. 15, 1962, Ser. No. 179,847
U.S. Cl. 340—173   14 Claims
Int. Cl. G11b 13/00; G01r 27/22; H03d 1/02

This invention relates to electrolytic cells of improved construction. The invention also relates to novel systems involving the use of electrolytic cells including the improved cells of this invention to provide timing operations. For example, the novel systems may be used to detect radar signals, to provide a record of the light characteristics at the different positions of a photograph and to provide a measurement of time as in different types of multivibrators.

The electrolytic or storage cell is generally characterized by two or more electrodes immersed in an electrolyte such as a solution of metallic ions. One of the electrodes is composed of an inert metal such as platinum, tungsten or tantalum, and another electrode is either composed of an active metal such as copper or silver or has a platinum base coated with copper or silver. The active metal from one electrode is plated on another electrode upon the application of a proper charge across the electrodes.

The storage cell has many characteristics which can be used in electrical circuits. For example, the storage cell is characterized by a relatively long discharge time constant with a linear relation between the amount of active metal transferred and the time required to obtain such a transfer upon the application of a constant voltage to obtain the transfer. The storage cell is also very sensitive since the voltage applied to the cell to produce plating from one electrode to another is small. Since the storage cell is sensitive and has a linear relationship between plating and charge, it can be used for accurate timing or measurement. Since it has a long discharge time constant, it is attractive for applications requiring long-term analogue storage. For example, by controlling the amount of active metal on one of the electrodes and by obtaining a discharge of the active metal to the other electrode, a particular time related to the amount of active metal so transferred can be measured.

It is also possible to use three electrodes to obtain a variable current time relationship. Two of the electrodes are composed of noble metal such as platinum, tungsten or tantalum and a third electrode is composed either of an active metal such as copper or silver or is composed of a base member coated with an active metal. It is then possible to use the third electrode as a variable element. Active metal can be initially plated from the third electrode to a particular one of the first two electrodes to control the amount of metal on the particular one of the first two electrodes. This causes a particular time relationship to be established for the transfer of the active metal between the first two electrodes. Since it is possible to plate as much active metal as desired from the third electrode to the particular one of the first two electrodes, the particular current-time relationship within the cell for the transfer of the active metal between the first two electrodes is variable.

The electrolytic cells described above have many uses in electrical circuits. For example, in one embodiment of the invention, the cell is used as an energy indicator or current integrator. The cell is incorporated in a circuit so that the current flowing in the circuit passes through the cell. The active metal is plated from one electrode containing active metal to an electrode formed from noble metal in proportion to the amount of current and the period of time during which the current flows. The cell, therefore, integrates with respect to time the current that flows in the circuit so as to serve as an energy indicator. Since the information is permanently stored within the cell, the measurement of the energy can be reserved for some later time.

The information is retrieved from the cell by passing current having a particular magnitude through the cell in an opposite direction to the original current. This causes the active metal to be deposited again on the electrode which originally contained all the active metal. A simultaneous measurement is taken of the period of time for all the active metal to be deposited again on the original electrode. Since the particular current is known, the time required to deposit the active metal on the original electrode indicates the energy originally produced in the electrical circuit. Information representing energies as low as a fraction of a coulomb and with no upper limit can be accordingly retrieved. For example, a dynamic range of $10^{10}$ between the lower and upper limits of measurements can be easily achieved by using a normal cell. Increased ranges of measurement can be attained by using special cells.

The above integrator can be used as a self-contained radar receiver. A small antenna is connected to the electrodes of the electrolytic cell. For example, a dipole having a length to receive signals at the radar frequency may be connected to the cell electrodes to receive radar energy which is present in the atmosphere. A diode may be connected to the dipole so that current can flow in only one direction between the electrodes in the cell. The amplitude of the radar signals and the time for the reception of the radar signals determine the amount of active metal deposited within the electrolytic cell from one electrode to the other. The amount of plating is later measured to give a determination of the energy received from the radar station. A plurality of these portable radar receivers tuned to various frequencies may be used to determine the specific frequency at which the radar station operates.

The portable receiver may also be used as a warning device by incorporating a particular amount of active material within the electrolytic cell. This may be accomplished with either a two-electrode or three-electrode structure. When all of the active metal is transferred from one electrode to the other, a signal device operates to indicate to the person holding the receiver that he has been within the receiving area for a particular time period. As previously described, the warning device may be used for radar signals by making the dipole antenna of a particular length. It will also be appreciated that the warning device may also be used for other frequencies by varying the length of the dipole antenna.

The electrolytic cells may also find application in multivibrator circuits. The period of time for the multivibrator to switch from one state of operation to the other is controlled by the time required to transfer the active metal from one of the electrodes in a two-electrode cell to the other. The cell is supplied with a potential of a first polarity to produce a flow of current in a first direction for a transfer of the active metal from a first electrode in the cell to a second electrode. When all the active metal is transferred from the first electrode, the voltage on the electrode increases. This increased voltage is instrumental in operating means for reversing the polarity of the potential between the first and second electrodes in the cell. The active metal then becomes transferred from the second electrode to the first electrode. When all the active metal becomes transferred from the second electrode to the first electrode, the increase in voltage on the second electrode is instrumental in returning the potential to its original polarity so that a transfer of the active metal is again initiated from the first electrode to the second electrode. In this way, the cycle repeats indefinitely to form a free running multivibrator.

The multivibrator can be modified to produce both monostable and bistable circuits. For example, one of the reversing means may be dependent upon a triggering signal from another source. Therefore, the cell operates for one cycle to obtain a transfer of the active metal from a first electrode in the cell to a second electrode and then back to the first electrode. A triggering signal is then required to have the cell operate for another cycle. This produces a monostable operation. If both reversing means require trigger inputs, the circuit operates for a half cycle to produce a bistable operation as in a flip-flop.

The electrolytic cell also has uses in memory devices. Information can be stored in the cell in accordance with the amount of active metal deposited from a first electrode in the cell to a second electrode in the cell. The information can be directly retrieved at any time by the replating of the active metal from the second electrode to the first electrode. The magnitude of the current and the time required to replate all of the active metal from the second electrode to the first electrode provide a direct determination as to the information originally stored in the cell. An inverse indication as to the original information may also be provided by transferring the rest of the active metal on the first electrode to the second electrode.

The memory device may either have erasable characteristics when energy is retrieved or two cells can be used to give permanent storage. The two electrolytic cells are connected in a loop circuit. As information is retrieved from the first cell, it is re-recorded within the second cell. If the information is desired again, it may be retrieved from the second cell and recorded again in the first cell. In this way, the information may be permanently stored within the two electrolytic cells until it is desired to introduce new information from an external source to the closed loop formed by the two cells.

A plurality of cells may be used to record many bits of information. The cells may be disposed in contiguous relationship to one another to record a pattern of information on a medium such as a photograph. Each of the cells may record the light intensity at a different position on the photograph so as to provide with the other cells a mosaic of the light characteristics at the different positions on the medium in accordance with the amount of the active metal transferred from the first electrodes to the second electrodes. The mosaic may be produced in the different cells by passing a collimated beam of light through the photograph. This causes the intensity of the collimated beam of light at various positions to be controlled in accordance with the light transmitting characteristics of the photograph at these positions. Individual photocells receive the light of variable intensity at the different positions and control the current flowing through the individual cells in the plurality.

In the drawings:

FIGURE 1 shows an electrolytic cell having two electrodes;

FIGURE 2 shows an electrolytic cell having three electrodes;

FIGURE 2A illustrates in block form a system which uses the electrolytic cell shown in FIGURE 2;

FIGURE 3 shows a portable radar receiver using a two-electrode electrolytic cell;

FIGURE 4 shows an array of portable radar receivers to cover a broad frequency band;

FIGURE 5A shows the typical response of one of the portable radar receivers, and FIGURE 5B shows the comparable responses of two adjacent portable radar receivers in the array of FIGURE 4;

FIGURE 6 shows a block diagram of a system for retrieving the information stored within the electrolytic cell;

FIGURE 7 shows a block diagram of a system for retrieving the information permanently stored within two electrolytic cells;

FIGURE 11 shows a memory device for recording information on a photographic medium such as a positive or negative and including a plurality of electrolytic cells each having a pair of electrodes;

FIGURE 12 shows a system for retrieving the information from the elctrolytic cells shown in FIGURE 11 with a permanent storage of the information; and FIGURE 13 illustrates a system for providing a graphic record as to the amount of energy being received at successive instants of time.

Figure 8:
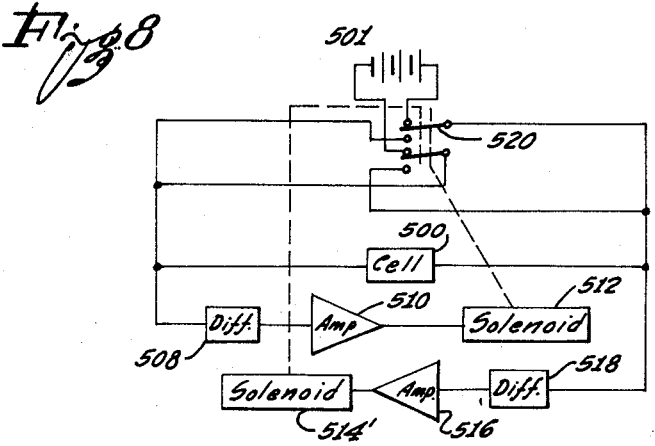
FIGURE 8 shows a block diagram of a free running multivibrator incorporating an electrolytic cell.

FIGURE 1 shows an electrolytic cell 10 having an envelope 12 formed from a chemically inert material such as a glass. The ends of the envelope 12 are sealed by members 14 and 16 which are also made from a chemically inert material. Passing through the members 14 and 16 are elctrodes 18 and 20. Contained within the electrolytic cell is an electrolyte 22 such as a solution of copper sulfate.

The electrode 18 may be composed of a chemically inert material such as a noble metal. By way of illustration, platinum, tungsten or tantalum may be used since it is not attacked by most known electrolytes. The electrode 20 may be completely composed of an active metal such as copper or silver or may be formed from a base member of a noble metal such as platinum, tungsten or tantalum with a coating of an active metal such as copper or silver. Tungsten and tantalum have been found to be advantageous since they have a different crystalline structure from silver. This prevents the tungsten or tantalum from absorbing the silver as the silver becomes deposited on the tungsten or tantalum.

The copper sulfate in the solution becomes ionized into copper ions having a positive polarity and sulfate ions having a negative polarity. When a positive voltage is applied to one of the electrodes such as the electrode 20 and a negative voltage is applied to the other electrode such as the electrode 18, the negative potential on the electrode 18 attracts the copper ions in the solution because of the positive polarity of these ions. The copper then becomes plated on the electrode 18. The copper on the electrode 20 becomes transferred as ions into the solution to replace the copper transferred to the electrode 20. The rate of transfer of the copper between the electrodes 18 and 20 is dependent upon the voltage applied between the electrodes.

The cell is initially nonsymmetrical in that the electrode 20 has all of the active metal and the electrode 18 has none of the active metal. As a first step, a small amount of copper is transferred from the electrode 20 to the electrode 18. After the small amount of copper is plated on the electrode 18, the cell may then be considered to be in equilibrium since both of the electrodes 18 and 20 have some of the active metal such as copper. Upon the introduction of a negative potential on the electrode 18, a current passes through the cell to obtain a transfer of the copper from the electrode 20 to the electrode 18. When the current becomes interrupted, the amount of copper transferred to the electrode 18 from the electrode 20 is representative of the integral of the current and the time for the passage of the current.

FIGURE 2 shows a three-electrode electrolytic cell 100 which is somewhat similar to the electrolytic cell 10 of FIGURE 1. An envelope 102 has sealing members 104 and 106 at the ends. There are two electrodes 108 and 110, both of which are composed of a noble metal such as platinum, tungsten or tantalum. A third electrode 112 extends through a sealing member 114 into the electrolytic cell. The electrode 112 is either formed from an active metal such as copper or has a base member such as platinum which is coated with an active metal. The electrolytic cell is filled with an electrolyte 116 such as copper sulfate.

The electrodes 108 and 110 do not initially have any active metal on their surfaces. As a first step, some of the active metal on the electrode 112 is deposited on a particular one of the electrodes 108 and 110. Since the electrode 112 may be considered to provide a reservoir of the active metal, the amount of the active metal initially transferred from the electrode 112 to the particular one of the electrodes 108 and 110 may be varied. For example, a signal to be measured may be applied between the electrode 112 and the electrode 108 to obtain a transfer from the electrode 112 to the electrode 108 of a particular amount of copper dependent upon the magnitude and duration of the signal. The information representing the integral of the magnitude and duration of the signal can be subsequently retrieved by passing a current of a constant magnitude through the cell for a sufficient length of time to transfer all of the copper on the electrode 108 to the electrode 110. The time required to transfer all of the copper from the electrode 108 to the electrode 110 is a measure of the integral of the magnitude and duration of the current. The copper may be plated back and forth between the electrodes 108 and 110 through a number of cycles to give an average value of the signal information. As will be appreciated, this average value may be more accurate than a single determination of the signal information since it tends to provide an average of any transient phenomena in the cell.

It will also be appreciated that the time constant for transferring the copper between the electrodes 108 and 110 may also be varied by varying the amount of copper initially transferred from the electrode 112 to the electrode 108. This may be important in timing devices or devices for providing a warning, as will become apparent from the subsequent discussion.

FIGURE 2A illustrates an arrangement for obtaining an automatic operation of the cell illustrated in FIGURE 2. As a first step, a switch 160 is closed to control the operation of a timer 162 in obtaining a transfer of active metal from the electrode 108 to the electrode 110. Upon the completion of the timing operation performed by the timer 162, the timer causes a solenoid 164 to become energized. The solenoid 164 actuates the switch 160 to open the switch and simultaneously actuates a switch 166 to the closed position. When the switch 166 becomes closed, a timer 168 becomes operative to obtain a transfer of a particular portion of the active metal on the electrode 110 to the electrode 112. It will be appreciated that the timers 162 and 168 may be adjusted to provide variable timing operations.

FIGURE 3 shows a portable radar receiver which includes a cell 200 having the same internal structure as the cell 10 shown in FIGURE 1. It will be appreciated, however, that a cell having a construction similar to that shown in FIGURE 2 may also be used. Electrodes 201 and 202 corresponding to the electrodes 18 and 20 in FIGURE 1 are extended beyond the cell 200 to act as a dipole antenna having a half wavelength at the radar frequency. A diode 204 is connected between the electrodes 201 and 202.

When antenna elements such as the elements 201 and 202 are used, it is desirable to grind the elements so that the ends 201a and 202a of the elements are flush with the walls of the cell 200, as illustrated in FIGURE 3. This causes the silver to be deposited only on the ends 201a and 202a of the wires 201 and 202. Since only a small area of the elements 201 and 202 is exposed to the electrolyte in the cell 200 such as in the order of $10^{-5}$ square centimeters, the effect of capacitance in the cell is minimized. The capacitance in the cell is minimized so as to have the cell 200 and the antenna elements 201 and 202 respond to high frequencies. Furthermore, when the capacitance in the cell is high, the current in the cell does not tend to stop upon the removal of the silver from one of the cells but continues thereafter to build charges at the inter-electrode faces. This prevents accurate measurements from being made as to the amount of energy received at the particular frequency.

The antenna elements 201 and 202 receive energy at the radar frequency since they are tuned to that frequency. This causes a current to flow through the electrolytic cell 10 with a magnitude proportional to the energy received at the radar frequency. The diode 204 allows the energy to pass in only one direction through the cell 10 to insure plating of active metal from a particular one of the electrodes to the other. The time period and the intensity of the radar energy determine the amount of active metal which is plated to give a representation of the radar energy at the particular frequency.

For S band operation, the total length of the elements 201 and 202 is aproximately 2 inches. For X band operation, the length is aproximately ¾ inch. For example, No. 40 wire may be used. Although the apparatus shown in FIGURE 3 has been described as a radar receiver, it will be appreciated that the apparatus may also be used to measure radiation at other frequencies.

The apparatus shown in FIGURE 3 may also be used as a warning device to indicate when a particular amount of energy has been received at the frequency to which the apparatus is tuned. Since the apparatus is quite small, it may be conveniently worn or carried by a person and may even be disposed in a clothes pocket. The apparatus may include a visual or aural warning device which becomes operative when all of the copper has been transferred from one of the electrodes to the other. This warning device may be operated by an end-point detector similar to that shown in FIGURES 6 and 7 and described in detail subsequently. Briefly, a voltage pulse is produced at electrode 202 upon the transfer of all the copper from one electrode to the other. A differentiator 205 sharpens the pulse and applies it to an amplifier 206. The output from the amplifier 206 controls the operation of a solenoid 207. If a sufficient voltage is applied to the solenoid it operates a warning device 208. The warning device can be, for example, a battery and a light bulb, with the solenoid controlling the application of the battery voltage across the light bulb.

It will be appreciated that a three-element electrolytic cell as shown in FIGURE 2 may also be used with the portable radar indicator. The third electrode is used to deposit a particular amount of active metal on a particular one of the other two electrodes to control the maximum amount of metal which can be plated between the first two electrodes. In this way, the apparatus can be used at a warning device or as a timing device whose operating characteristics are varied under different circumstances.

An array of dipoles 180 as illustrated in FIGURE 4 may provide complete coverage through a range of frequencies such as radar energy in the S and X bands. Since harmonic resonances occur within each of the antenna elements, the correct frequency of the incident radar energy may be considered to be indicated by the lowest frequency dipole which responds to the radar energy. Furthermore, only a limited array of dipoles is required to provide coverage through an extended range of frequencies since each dipole has a fairly broad frequency response.

FIGURE 5A shows the general relationship of antenna response and frequency for any given element. As will be seen, the antenna responds to a fundamental frequency as at 210 and a harmonic frequency as at 212. In the array, the superimposed curves for two adjacent elements would appear as illustrated at 214 and 216 in FIGURE 5B. This indicates that each element has a fairly broad frequency response. From two or more adjacent dipoles of different length, it is possible to obtain the exact frequency of the incident radar field by considering the relative amount of active metal transferred in each of the dipoles. Furthermore, if the extended range of frequencies is sufficiently great, each dipole may be responsive to one or more harmonics as well as the fundamental frequency. This further tends to limit the number of dipoles required in an array to measure an extended range of frequencies.

FIGURE 6 illustrates a block diagram of a system for measuring the amount of energy that the cell has received and has converted into stored information as represented by active metal transferred from one electrode to another. A cell 301 is shown of the same type as illustrated in FIGURE 1, although it will be appreciated that a three-element cell as shown in FIGURE 2 may also be used. Connected across the cell is a source 300 of potential such as a battery. A switch 302 is used to connect and disconnect the source 300 of potential from the cell. A meter 304 is in series with the cell to measure the current passing through the cell. A timer 306 is in parallel with the source 300 of potential and the switch 302.

The source 300 of potential provides for a flow of current between the electrodes of the cell 301 in a reverse direction to the current which has initially plated the active metal from a first electrode to a second electrode. The meter 304 measures the current which flows through the cell to replate the active metal from the second electrode to the first electrode and the timer 306 determines the length of time for such complete replating. The integral of the current and time is representative of the information which has been previously supplied to the cell in the form of active metal transferred from the first cell to the second cell. Since the current remains constant, the time required to replate from the second electrode to the first electrode provides a direct indication of the information originally introduced to the cell.

An end-point detector generally indicated at 312 is provided to discontinue the application of the potential from the source 300 to the cell 301 when the replating process is complete. The end-point detector 312 may include a differentiator 308 connected to one side of the cell. The signal from the differentiator 308 is applied to an amplifier 310, which controls the operation of a solenoid 312. The solenoid 312 in turn controls the operation of the switch 302. The amplifier 310 and the solenoid are included in the end-point detector 312. Although one particular type of end-point detector is shown, it will be appreciated that other types of detectors may also be used.

During the time that the replating operation is occurring current flows through the cell 301 and produces a movement of negative ions to the second electrode, which may be considered as the electrode from which the active metal is being removed. This causes the voltage at the second electrode to be somewhat below the positive voltage from the source 300. When complete replating occurs, all of the active metal leaves the second electrode and causes the voltage on that electrode to rise relatively rapidly to a potential approaching that of the source 300. This causes a voltage pulse to be produced in the cell 301 at the second electrode. The differentiator 308 sharpens the voltage pulse which is produced at the second electrode. This pulse is amplified by the amplifier 310 and is applied to the solenoid 312, which becomes energized to disconnect the switch 302. The switch 302 is of a snap type which remains in one position until actuated to another position.

FIGURE 7 illustrates another circuit for retrieving information stored within the cell 10. All elements having similar functions are given similar numerals as in FIGURE 6. FIGURE 7 additionally includes a cell 401 which is identical to the cell 301 in FIGURES 6 and 7. When the information represented by the active metal on the second electrode in the cell 301 is being retrieved from the cell by the passage of a current through the cell as in the embodiment shown in FIGURE 6, the same current is passing through the cell 401 to plate active metal from a first electrode to a second electrode in the cell 401. This causes the same amount of active metal to be transferred from the first electrode to the second electrode in the cell 401 as returned from the second electrode to the first electrode in the cell 301. Because of this, the total information stored in the cell 401 is the same as that previously contained in the cell 301. The information, therefore, is permanently stored in one of the cells 301 and 401. The information can be passed between the cells 301 and 401 in a number of successive cycles to enhance the accuracy of the information by obtaining an average value of the information. If the cell is used as a memory device, the system of FIGURE 7 serves to allow the information to be permanently stored for repetitive operations.

It will be appreciated that the embodiments shown in FIGURES 6 and 7 may be operated in a somewhat different manner without departing from the scope of the invention. This may be accomplished by transferring to the second electrode in the cell 301 the remaining active metal from the first electrode. Since the material originally on the first electrode is known, the information represented by the active metal previously transferred to the first electrode can be obtained by subtracting the active metal transferred to the second electrode during the measuring operation from the total amount of active metal originally on the first electrode. It will also be appreciated that the information can be retrieved by transferring the active metal on either the first or second electrodes to the third electrode.

FIGURE 8 shows a free running multivibrator using two end-point detectors as shown in FIGURES 6 and 7. The multivibrator shown in FIGURE 8 includes a cell 500 having either two electrodes as shown in FIGURE 1 or three electrodes as shown in FIGURE 2. The cell 500 initially has a particular amount of active metal on a first one of the electrodes to control the time constant of the multivibrator. A voltage from a source 501 is applied to the cell 500 through a double-pole double-throw switch 520. The position of the switch 520 controls the polarity of the voltage which is applied to the cell 500. Although the switch 520 is illustrated as having contacts and movable arms to engage the contacts, it will be appreciated that static switches such as those formed from vacuum tubes and transistors may also be used.

The positions of the movable arms in the switches 520 are controlled by a pair of solenoids 512 and 514. When the solenoid 512 is energized, it actuates the movable arms of the switches into engagement with the lower stationary contacts of the switches in FIGURE 8. Similarly, the movable arms of the switches become actuated into engagement with the upper stationary contacts of the switches in FIGURE 8 when the solenoid 514 becomes energized. As will be seen in FIGURE 8, the voltage from the source 501 is applied to the cell 500 in one direction when the movable arms of the switch 520 engage the lower stationary contacts of the switches. The voltage from the source 501 is applied to the cell 500 in an opposite direction when the movable arms of the switches 520 engage the upper stationary contacts of the switches. The movable arms of the switches 520 are initially assumed to be engaging the upper stationary contacts of the switches as illustrated in FIGURE 8.

The voltage initially applied across the cell 500 causes the active metal to be transferred from the first electrode to a second electrode in the cell and a voltage pulse to be generated at the first electrode of the cell when the transfer is complete. This pulse is sharpened by a differentiator 508, is amplified by an amplifier 510 and is applied to the solenoid 512 to energize the solenoid. This causes the polarity of the voltage applied from the source 501 to the cell 500 to become reversed.

The cell now replates the active metal in a reverse direction from the second electrode to the first electrode. When all the active metal has become deposited on the first electrode, a voltage pulse is produced at the second electrode. This voltage pulse is sharpened by a differentiator 518, amplified by an amplifier 516 and applied to the solenoid 514. The solenoid 514 then becomes energized to actuate the movable arms of the switches 520 into engagement with the upper stationary contacts of the switches. This causes a new cycle of operation to be initiated.

The multivibrator shown in FIGURE 8 oscillates in accordance with the transfer of the active metal between the first and second electrodes in the cell 500. The frequency of operation of the multivibrator is dependent upon the magnitude of the current flowing through the cell and upon the amount of active metal included in the cell 500. The amount of active metal can be varied when a cell configuration similar to that shown in FIGURE 2 is used. In this way, the time constant of the embodiment shown in FIGURE 8 can be correspondingly varied in the free-runing multivibrator shown in FIGURE 8. It will be appreciated that the free-running multivibrator shown in FIGURE 8 may also be considered as a specific embodiment of a coulometer or time integrator, as may the other systems included in this application.

Figure 9:
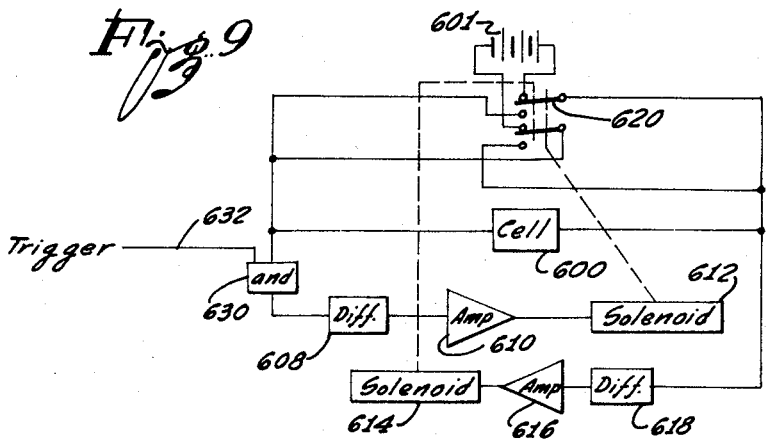
FIGURE 9 shows a block diagram of a monostable multivibrator.

FIGURE 9 illustrates a monostable multivibrator which is somewhat similar in construction to the free-running multivibrator shown in FIGURE 8. The components shown in FIGURE 9 have numerical designations similar to those illustrated in FIGURE 8 except that they have designations with "6" instead of "5" as the hundreds digit. The multivibrator shown in FIGURE 9 additionally includes an "and" circuit 630 which is connected between the cell 600 and the differentiator 608. The "and" network 630 also has a second input terminal which is connected to receive a triggering signal from a line 632. The "and" network 630 may be constructed in a manner similar to that disclosed and illustrated in detail on page 32 of "Arithmetic Operations in Digital Computers" by R. K. Richards (published by D. Van Nostrand Company, Inc., of Princeton, N.J., in 1955).

The cell 600 is normally operative so that a relatively high voltage appears on a first electrode of the cell because of the absence of any active metal on the electrode. This voltage is applied to the "and" network 630 to prepare the "and" network for activation. When a voltage is simultaneously introduced to the "and" network 630 through the line 632 to represent a triggering signal, a signal passes through the "and" network to the differentiator 608. This signal is sharpened by the differentiator 608 and is amplified by the stage 610 and applied to the solenoid 612 to energize the solenoid. The solenoid 610 then actuates the movable arms of the switches 620 into engagement with the lower stationary contacts of the switches in FIGURE 9 so as to reverse the polarity of the voltage applied from the source 601 to the cell 600.

When the polarity of the voltage applied to the cell 600 becomes reversed, the active metal on the second electrode of the cell becomes transferred to the first electrode. Upon a complete transfer of the active metal from the second electrode, a voltage pulse is produced on the second electrode. This voltage pulse is differentiated by the stage 618, amplified and applied to the solenoid 614 to energize the solenoid. The energizing of the solenoid 614 causes the polarity of the voltage applied to the cell 600 to become reversed so that the active metal on the first electrode of the cell becomes transferred to the second electrode of the cell.

The transfer of the active metal from the first electrode to the second electrode of the cell 600 continues until all of the metal has become transferred. At this time, a relatively high voltage is again produced on the first electrode of the cell 600. However, this voltage is not able to pass through the "and" network 630 until a triggering signal is again produced on the line 632. In this way, a complete cycle of operation is initiated only when triggering signals are introduced to the "and" network 630 through the line 632.

Figure 10:
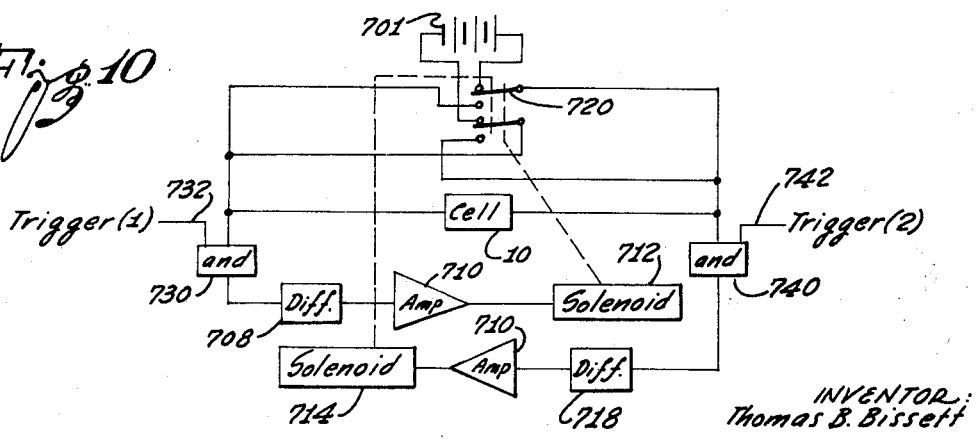
FIGURE 10 shows a block diagram of a bistable multivibrator, which is commonly designated as a flip-flop.

FIGURE 10 illustrates the circuit of FIGURE 9 modified to produce a flip-flop or bistable multivibrator. The circuitry is the same as that illustrated in FIGURE 9 except that an additional "and" circuit 740 is connected between a cell 700 and a differentiator 718. The "and" network 740 also has a second input terminal connected to a line 742 to receive triggering signals. Other than the "and" network 740 and the line 742, the elements shown in FIGURE 10 have numerical identifications similar to those shown in FIGURE 9 except that they have numerical identifications with "7" rather than "6" as the hundreds digit.

One stage of the circuit illustrated in FIGURE 10 operates in a similar fashion to that illustrated in FIGURE 9. When the current passes to completely plate the active metal on the second electrode, the differentiator 708 does not detect a change in voltage unless there is a trigger input to the "and" circuit 730 through the line 732. This prevents the active metal on the second electrode from becoming transferred to the first electrode until the introduction of a triggering signal through the line 732. In like manner, the active metal on the first electrode of the cell 700 cannot become transferred to the second electrode until all of the metal has been transferred to the first electrode and a triggering signal has thereafter been introduced to the "and" network 740 through the line 742. The circuit shown in FIGURE 10, therefore, is maintained in either one of two stable states requiring a first trigger input to the "and" circuit 730 to operate the cell in a first direction and requiring a second trigger input to the "and" circuit 740 to operate the cell in the reverse direction.

FIGURE 11 shows the use of a plurality of electrolytic cells 800 as a memory device. Each of the cells 800 contains a pair of electrodes 802 and 804, the electrode 802 being coated with an active metal and the electrode 804 being formed from a noble metal. A plurality of photocells 806 are individually connected to the cells 800. The photocells are activated by a collimated beam of light from a light source 808. The collimated beam 810 passes through a medium 812 having a variable pattern of light transmitting characteristics. By way of illustration, the medium 812 may constitute the negative or positive of a photograph.

As the light beam passes through the medium 812, the beam is modified in intensity at individual positions in accordance with the light transmitting characteristics of the medium 812 at these positions. This individually activates the photocells 806 in the plurality so that each photocell produces a voltage in accordance with the intensity of the light which impinges on the photocell. The voltage from each individual photocell 806 is applied to a different one of the cells 800 to obtain a transfer of active metal to the electrode 808 from the electrode 802 in accordance with the voltage from that photocell. The voltages from all of the photocells 806 are applied to the electrolytic cells 800 for the same period of time so that each storage electrode 804 receives an amount of active metal only in proportion to the information at an individual position on the medium 812.

FIGURE 12 illustrates a system for retrieving the information from the electrolytic cells 800. The circuitry for retrieving the information is similar to that shown in FIGURES 6 and 7. A source 850 applies the voltage to the cells 800 to obtain a transfer of active metal between the electrodes in the cells. A plurality of timers 830 measure the time period in which the current flows through the different ones of the cells 800 to obtain complete replating of the active metal from one of the electrodes to the other electrode in the cells. When the replating is complete in each cell 800, a voltage pulse is generated and is introduced to the differentiator 832 which is connected to that cell. This pulse is then amplified by an associated amplifier 834 and applied to an associated solenoid 836. The solenoid 836 opens an associated switch 838 to interrupt the introduction of voltage from the source 850 to the cell 800. As the information is retrieved from each cell 800 and measured, it is also stored within an identical cell 840. In this way, a permanent storage of the information in the cells 800 may be obtained FIGURE 13 illustrates a system for providing a continuous record as to the amount of energy being presented at successive instants of time. For example, a record may be made as to the variable temperature of a room at successive instants of time. This variable temperature may be converted to an electrical voltage by using a thermocouple 900. The voltage from the thermocouple 900 is applied between a pair of electrodes 902 and 904. The electrode 902 is substantially perpendicular to the electrode 904 and is coated with silver. The electrode 904 is disposed around a pulley and is movable at a substantially constant rate as by a motor 906. The electrode 904 is made from a suitable material such as platinum, tungsten and tantalum. As the electrode 904 moves past the electrode 902, it is coated at each instant with an amount of silver dependent upon the voltage from the thermocouple 900 at that instant. In this way, the electrode 902 provides a graphic record as to variations in the temperature at successive instants of time in accordance with the amount of silver deposited at progressive positions along the electrode 904.

The application has been disclosed with reference to particular embodiments. However, it will be apparent to those skilled in the art that other modifications may be made evolving from the concepts set forth in this application and, therefore, the application is to be limited only by the appended claims. For example, the term "active metal" as used in the specification and in the claims is intended to cover any material, including a metal, which may be disposed in an electrolytic cell to become deposited by an electrolytic action from one electrode to another electrode in the cell.

I claim:

1. A system for detecting and indicating a particular frequency of electromagnetic energy, including,
   an electrolytic cell including an electrolytic solution and a first electrode, a second electrode and a third electrode disposed in the electrolytic solution and including a particular amount of an active metal on the first electrode, the first and second electrodes being constructed to obtain a transfer of the active metal between the electrodes, means operatively coupled to the first and second electrodes in the electrolytic cell for obtaining a deposit of a particular portion of the active metal from the first electrode to the second electrode in representation of particular information and wherein the third electrode controls the particular amount of the active metal initially deposited on the second electrode in the cell and wherein the third electrode initially has at least the particular amount of active metal before the active metal becomes transferred to the second electrode, means operatively coupled to the first and second electrodes for producing a transfer of the active metal on one of the first and second electrodes at a particular rate to the other one of the first and second electrodes after the transfer of the particular amount of the active metal from the first electrode to the second electrode to produce a voltage surge on the one of the first and second electrodes after the transfer of the active metal to the other one of the first and second electrodes, and means including a differentiator operatively coupled to the one of the first and second electrodes for providing an output indication as to the time for the transfer of the active metal from the first and second electrodes upon the production of the voltage surge.

2. An integrator, including,
   envelope means containing an electrolytic solution,
   first and second electrodes composed of a noble metal and extending through the envelope means into the electrolytic solution,
   a third electrode extending through the envelope means into the electrolytic solution and having its external surface formed from an active metal,
   means operatively coupled to the third electrode and the first electrode for obtaining a transfer of a controlled amount of the active metal from the third electrode to the first electrode,
   means operatively coupled to the first and second electrodes for obtaining a transfer of a particular portion of the active metal on the first electrode to the second electrode in representation of particular information,
   means for obtaining a transfer from one of the first and second electrodes of the active metal on that electrode to one of the other electrodes at a particular rate to obtain a voltage surge on the one of the first and second electrodes upon such transfer, and
   means responsive to such voltage surge for providing an indication as to the time for the completion of the transfer of the active metal from the one of the first and second electrodes.

3. A timing circuit, including,
   an electrolytic cell including
   an electrolytic solution,
   a first electrode extending into the electrolytic solution and formed from a base member coated with active metal, and
   a second electrode means extending into the electrolytic solution and formed from a base member;
   means operatively coupled to the first and second electrodes for applying energy between the electrodes in a first direction to obtain a transfer of the active metal on the first electrode to the second electrode;
   means operatively coupled to the energy applying means for obtaining a reversal in the direction of energy flow to provide a transfer at a particular rate of the active metal plated on the second electrode to the first electrode and to produce a voltage surge on the second electrode upon the completion of such transfer, and
   means including a differentiator responsive to such voltage surge for providing an output indication as to the time for the completion of such transfer of the active metal.

4. The timing circuit of claim 3 wherein the last-mentioned means includes an end-point detector responsive to the plating of all the active metal from the second electrode to the first electrode to obtain a transfer of the active metal from the first electrode to the second electrode.

5. The timing circuit of claim 4 wherein additional means including a second end-point detector are responsive to the transfer of all the active metal from the second electrode to the first electrode to reapply the energy in the first direction for a transfer of the active metal from the first electrode to the second electrode.

6. A timing circuit, including,
   an electrolytic cell including
   a first electrode formed from a base metal coated with an active metal,
   a second electrode formed from a material having properties of inhibiting ionization of the base member,
   an electrolytic solution in contact with the first and second electrodes;
   means operatively coupled to the electrolytic cell for applying a potential between the first and second electrodes to obtain a transfer of the active metal between the electrodes,
   reversing means operatively coupled to the potential means and having first and second states of operation to provide for the introduction of the potential between the first and second electrodes in a first direction in the first state of operation for a transfer of the active metal on the first electrode to the second electrode and to provide for the introduction of the potential between the first and second electrodes in a reverse direction in the second state of operation for the transfer of the active metal on the second electrode to the first electrode, first and second trigger means having values in accordance with first and second states of information, first control means operatively coupled to the first electrode in the cell and responsive to the transfer of all the active metal on the first electrode to the second electrode to produce an operation of the reversing means in the second state, and second control means operatively coupled to the second electrode in the electrolytic cell and responsive to the transfer of all the active metal on the second electrode to the first electrode to produce an operation of the reversing means in the first state.

7. The combination set forth in claim 6 in which third control means are included for providing an external triggering signal and in which means are operatively coupled to the first control means and to the third control means for obtaining an operation of the reversing means in the second state only upon the transfer of all of the active metal on the first electrode to the second electrode and only upon the subsequent introduction of a triggering signal from the third control means.

8. In combination, an electroyltic cell including an electrolytic solution and including at least two electrodes extending into the electrolytic cell in a spaced relationship to each other and formed from a base member having properties of inhibiting the transfer of the base member into the solution, a first one of the electrodes being coated with an active metal to obtain an ionization of the active metal into the solution for a transfer of the active metal to the second electrode, first means operatively coupled to the electrodes for applying energy to the electrodes to obtain a transfer of a particular amount of the active metal from the first electrode to the second electrode, the particular amount of the active metal transferred being dependent upon the amplitude of the energy and the time period of application, second means operatively coupled to the first electrode and responsive to the transfer of the particular amount of the active metal from the first electrode to the second electrode to obtain a transfer of all of the active metal from one of the electrodes to the other electrode at a particular rate to obtain a voltage surge upon the transfer of all of such active metal, third means responsive to the transfer of all of the active metal from the one of the electrodes to the other of the electrodes for providing an output indication as to the time for such transfer, and fourth means responsive to the transfer of all of the active metal from the one of the electrodes to the other electrode for initiating a controlled transfer of the active metal from the other electrode to the one of the electrodes.

9. In combination, an envelope, an electrolytic solution in the enevlope and having properties of producing positive and negative ions, a first electrode in the envelope and extending into the electrolytic solution and made from a material having properties of inhibiting ionization of the material upon disposition of the first electrode in the solution, a second electrode in the envelope and extending into the electrolytic solution and made from a material having properties of inhibiting ionization of the material upon disposition of the second electrode in the solution, a third electrode in the envelope and extending into the electrolytic solution and coated with an active metal and disposed relative to the first electrode to obtain a transfer of a variable amount of the active metal at first particular times from the third electrode to the first electrode for a subsequent transfer of the metal between the first and second electrodes and to obtain a transfer of a variable amount of the active metal at second particular times from the third electrode to the second electrode for a subsequent transfer of the metal between the first and second electrodes, means for obtaining a controlled transfer of a particular amount of the active metal from the third electrode to a particular one of the first and second electrodes, and means responsive to the controlled transfer of the particular amount of the active metal from the third electrode to the particular one of the first and second electrodes for initiating a transfer of such active metal between the first and second electrodes.

10. The combination set forth in claim 9, including, means for subsequently determining the particular amount of the active metal transferred between the first and second electrodes.

11. An electrolytic cell, including, an envelope, an electrolytic solution in the envelope and having properties of producing positive and negative ions, a first electrode sealed into the envelope at one end of the envelope and made from a material having properties of inhibiting ionization of the material upon disposition of the first electrode in the solution, a second electrode sealed into the envelope at a second end of the envelope and made from a material having properties of inhibiting ionization of the material upon disposition of the second electrode in the solution, and a third electrode sealed into the envelope at a position between the first and second electrodes and coated with a material to obtain a transfer of a variable amount of material from the third electrode to a particular one of the first and second electrodes for a subsequent transfer of the variable amount of material between the first and second electrodes.

12. In combination, an electrolytic cell including an electrolytic solution within the cell and having properties of becoming ionized into positive and negative ions and including a first electrode extending into the electrolytic solution and made from a material having properties of inhibiting ionization of molecules of the material into the solution and of receiving ions from the solution and including a second electrode extending into the electrolytic solution and coated with an active metal to obtain an ionization of the metal into the solution and a transfer of the metal to the first electrode, first switching means having first and second states, second switching means having first and second operative states, first means operatively coupled to the first and second electrodes and to the first switching means for obtaining a transfer of a particular amount of the active metal from the second electrode to the first electrode in the first operative state of the switching means and for interrupting such transfer in the second operative state of the first switching means, second means operatively coupled to the first and second switching means for obtaining an operation of the second switching means in the first state and the first switching means in the second state upon the transfer of the particular amount of the active metal from the second electrode to the first electrode, third means operatively coupled to the second switching means for instituting a transfer of all of the active metal on one of the first and second electrodes to the other one of the first and second electrodes to obtain a production of a voltage surge at the one of the first and second electrodes upon the completion of such transfer, and fourth means for indicating the integral of the rate of transfer of the material from the one of the first and second electrodes to the other one of the first and second electrodes and the time during which such transfer has occurred.

13. The combination set forth in claim 12 in which the third means is operative to obtain a transfer of the active metal from the first electrode back to the second electrode at a substantially constant rate and in which the fourth means includes means for measuring the time from the initiation of the transfer of the active metal from the first electrode back to the second electrode until the production of the voltage surge at the first electrode.

14. The combination set fourth in claim 12 in which the third means is operative to obtain a transfer of the remaining amount of the active metal on the second electrode to the first electrode at a substantially constant rate and in which the fourth means includes means for measuring the time from the initiation of the transfer of the remaining amount of the active metal from the second electrode to the first electrode until the production of the voltage surge at the second electrode.

References Cited

UNITED STATES PATENTS

| | | | |
|---|---|---|---|
| 3,125,673 | 3/1964 | Puterbaugh | 324—94 |
| 3,172,083 | 2/1965 | Constantine | 340—173 |
| 3,210,662 | 10/1965 | Steinmetz | 324—94 |
| 2,890,414 | 6/1959 | Snavely | 324—94 |
| 2,910,647 | 10/1959 | Kreitsek | 324—68 |
| 2,910,648 | 10/1959 | Keller | 324—94 |
| 2,939,113 | 5/1960 | Roth | 340—173 |
| 3,017,612 | 1/1962 | Singer | 340—173 |

TERRELL W. FEARS, *Primary Examiner.*

U.S. Cl. X.R.

324—94; 329—196